(12) United States Patent
Brandl et al.

(10) Patent No.: US 10,476,361 B2
(45) Date of Patent: Nov. 12, 2019

(54) CAGE ROTOR COMPRISING A DEFORMABLE BEARING

(71) Applicant: SIEMENS AKTIENGESELLSCHAFT, München (DE)

(72) Inventors: Konrad Brandl, Thalmassing (DE); Siegfried Fichtner, Allersberg (DE); Maximilian Pfaller, Nürnberg (DE); Patryk Piotrowski, Nürnberg (DE); André Trepper, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 71 days.

(21) Appl. No.: 14/439,555

(22) PCT Filed: Oct. 10, 2013

(86) PCT No.: PCT/EP2013/071142
§ 371 (c)(1),
(2) Date: Apr. 29, 2015

(87) PCT Pub. No.: WO2014/067756
PCT Pub. Date: May 8, 2014

(65) Prior Publication Data
US 2015/0295483 A1   Oct. 15, 2015

(30) Foreign Application Priority Data
Oct. 30, 2012   (EP) .................................... 12190600

(51) Int. Cl.
*H02K 17/16*   (2006.01)
*H02K 1/26*   (2006.01)
(Continued)

(52) U.S. Cl.
CPC ............. *H02K 17/165* (2013.01); *H02K 1/26* (2013.01); *H02K 1/265* (2013.01); *H02K 15/0012* (2013.01); *H02K 15/063* (2013.01)

(58) Field of Classification Search
CPC ............. H02K 177/16; H02K 177/165; H02K 177/18; H02K 177/185; H02K 15/0012
(Continued)

(56) References Cited

U.S. PATENT DOCUMENTS 3,902,087 A * 8/1975 Hakamada ........... C08G 18/003
                                                  310/211
7,362,027 B2   4/2008 Fichtner et al.
(Continued)

FOREIGN PATENT DOCUMENTS

CA   1119651 A *   3/1982   ............. H02K 17/16
CA   2343198 A1   1/2001
(Continued)

*Primary Examiner* — Quyen P Leung
*Assistant Examiner* — Minki Chang
(74) *Attorney, Agent, or Firm* — Henry M. Feiereisen LLC

(57) ABSTRACT

A cage rotor for an electric machine, has a laminated rotor core having a groove, a rotor end ring that is cast on to one axial end of the laminated core and has a first material and a bar situated in the groove and supported by a deformable bearing having a bearing device. A laminated rotor core for a cage rotor includes a groove and a bearing device, an electric machine with a cage rotor, a method for producing a laminated rotor core by producing a bearing device on the laminated rotor core, and a method for producing a cage rotor by supporting a bar in a groove by a deformable bearing having a bearing device.

18 Claims, 7 Drawing Sheets

(51) Int. Cl.
*H02K 15/00* (2006.01)
*H02K 15/06* (2006.01)

(58) Field of Classification Search
USPC .............. 310/125, 156.78, 156.81, 211
See application file for complete search history.

(56) References Cited

U.S. PATENT DOCUMENTS

| | | | |
|---|---|---|---|
| 8,283,817 B2 | 10/2012 | Weiss et al. | |
| 8,519,580 B2 | 8/2013 | Brandl et al. | |
| 2006/0267441 A1* | 11/2006 | Hang | B22D 19/0054 310/211 |
| 2008/0185934 A1 | 8/2008 | Verhoeven | |
| 2011/0006622 A1 | 1/2011 | Weiss et al. | |
| 2011/0101811 A1* | 5/2011 | Finkle | H02K 21/028 310/156.24 |
| 2011/0140550 A1 | 6/2011 | Brandl et al. | |
| 2011/0316380 A1* | 12/2011 | Buttner | H02K 17/165 310/211 |
| 2012/0187796 A1* | 7/2012 | Buttner | B22D 19/0054 310/211 |
| 2013/0187512 A1* | 7/2013 | Buttner | H02K 17/165 310/211 |
| 2013/0270939 A1 | 10/2013 | Brandl et al. | |

FOREIGN PATENT DOCUMENTS

| | | |
|---|---|---|
| CN | 201215905 Y | 4/2009 |
| CN | 201312153 Y | 9/2009 |
| CN | 102318169 A | 1/2012 |
| DE | 3043800 A1 | 10/1981 |
| FR | 2220912 A1 | 10/1974 |
| JP | S5683251 A | 7/1981 |
| RU | 2133072 C1 | 7/1999 |
| RU | 2386201 C2 | 4/2010 |
| WO | WO 2012041943 A2 * 4/2012 | ......... H02K 15/0012 |

* cited by examiner

FIG 1
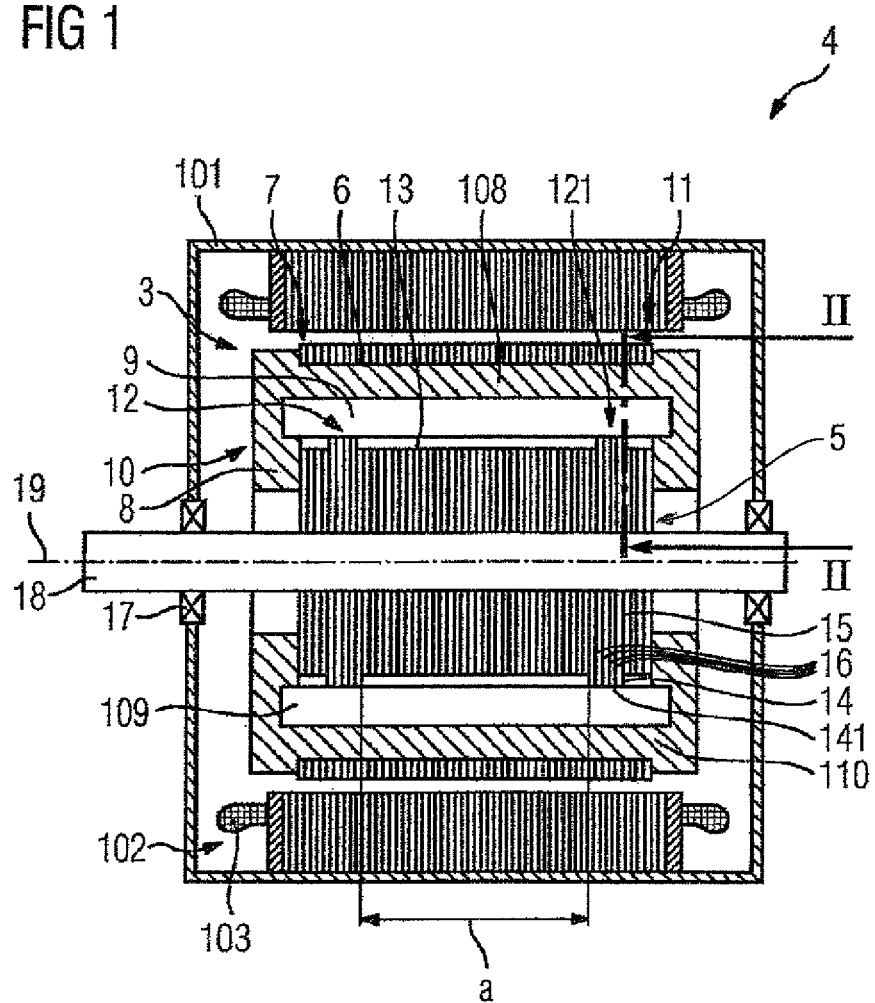
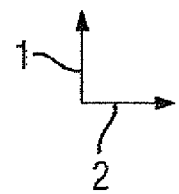

FIG 4
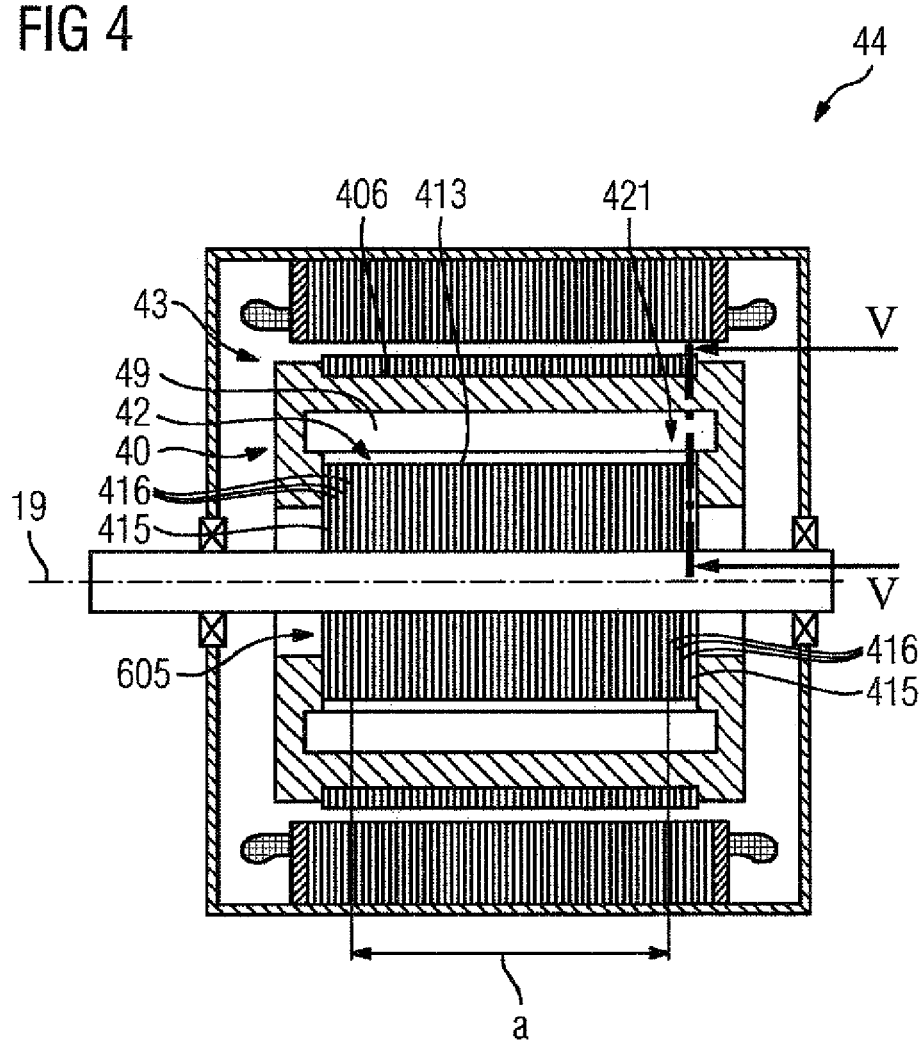
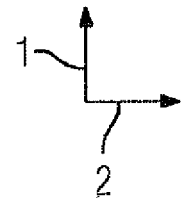

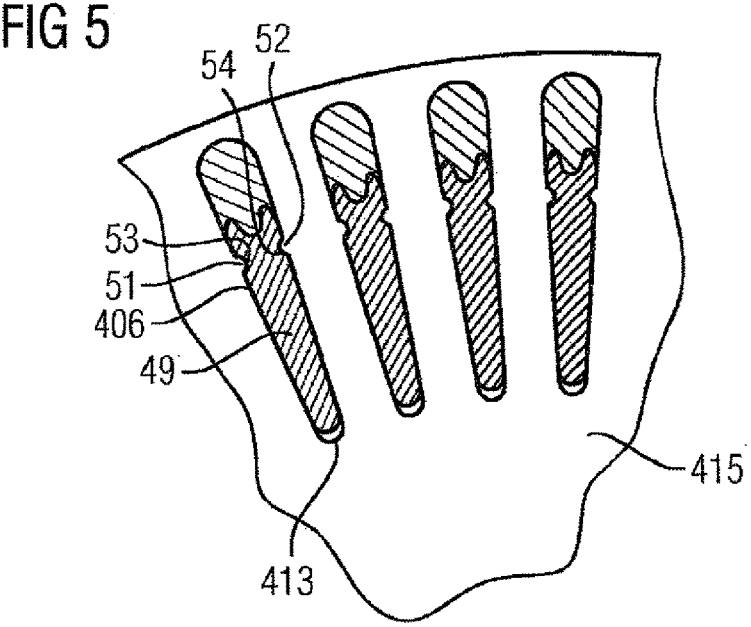
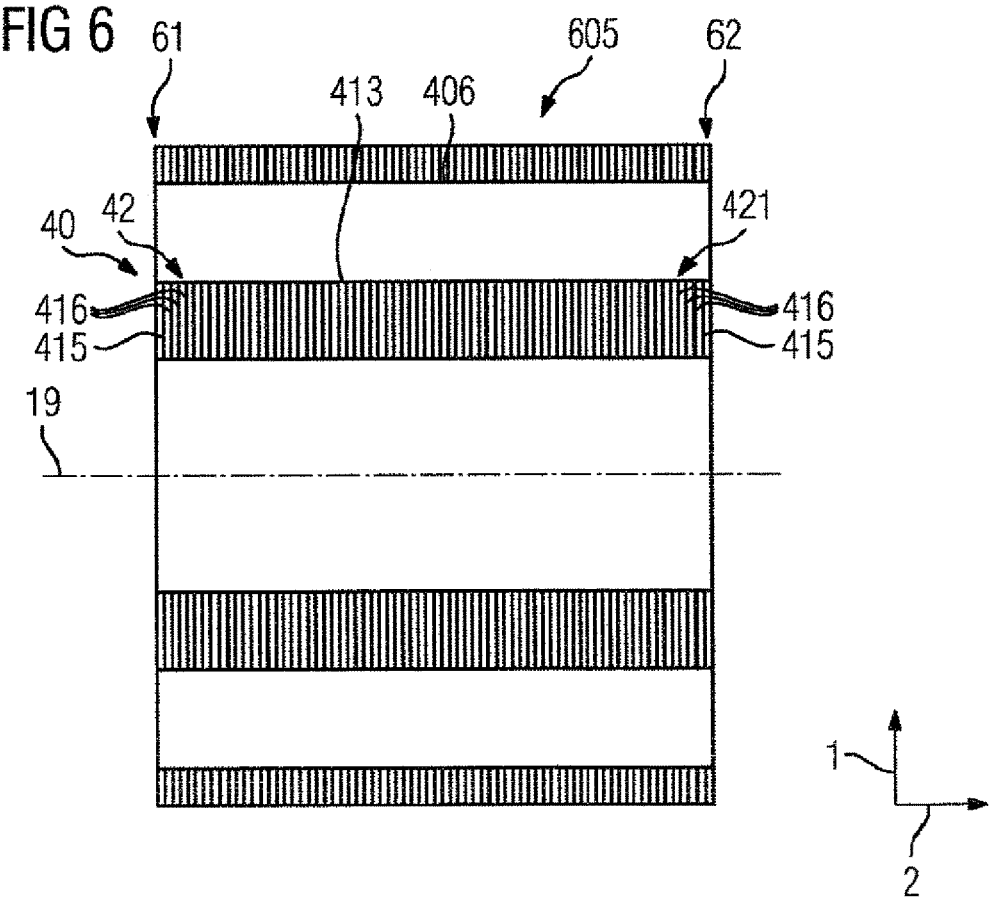

FIG 8
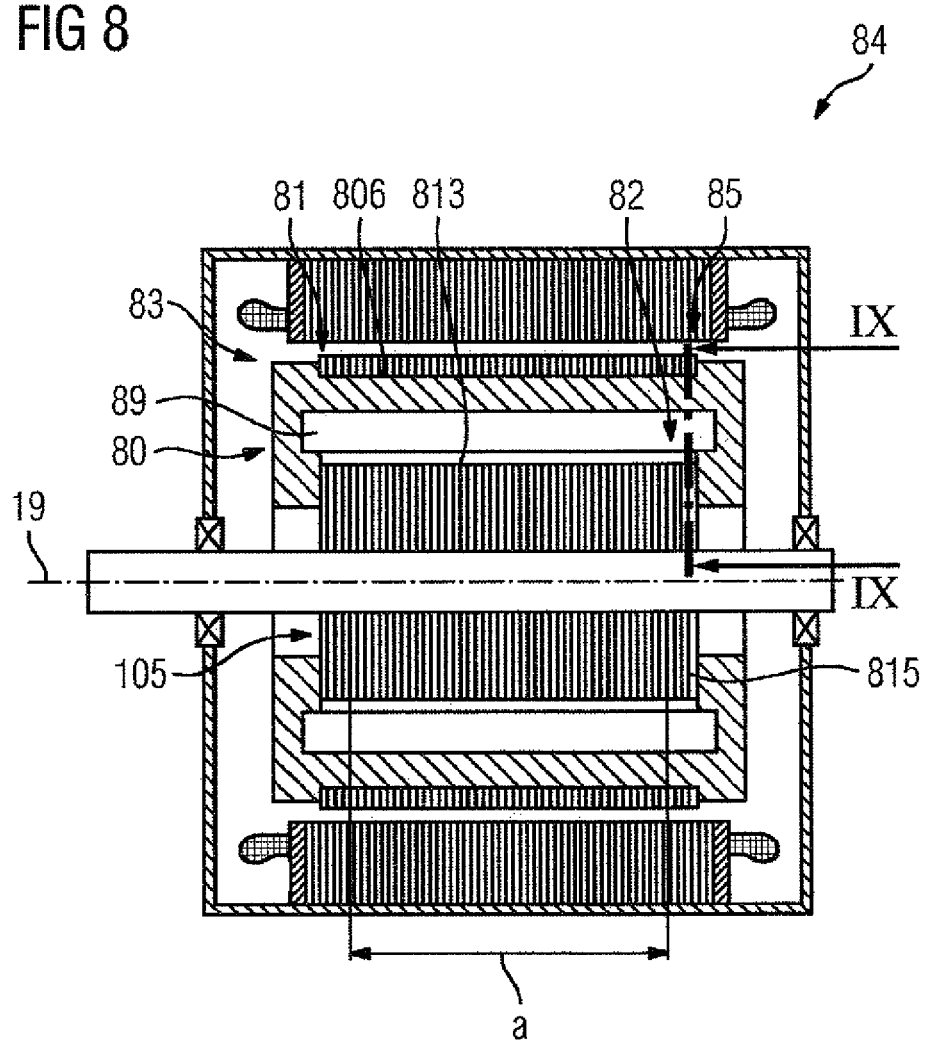
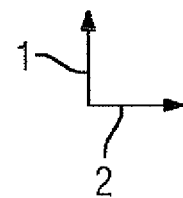

FIG 9
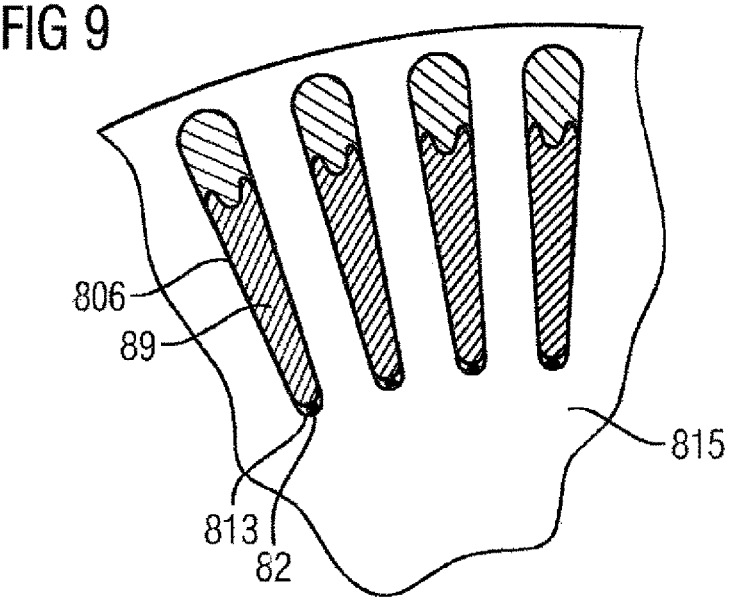
FIG 10
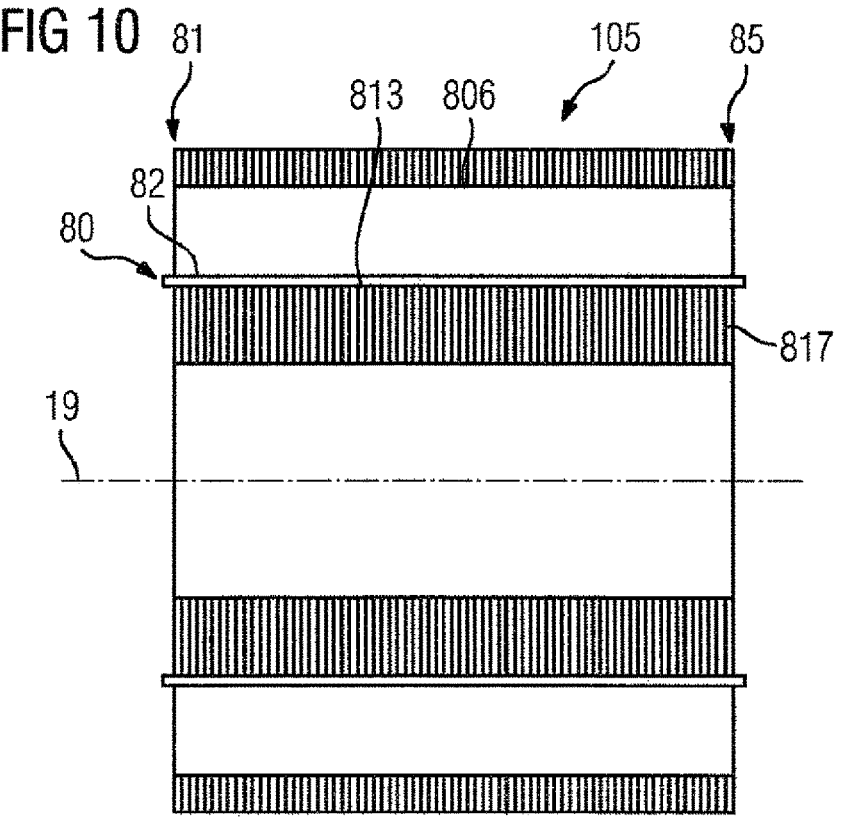
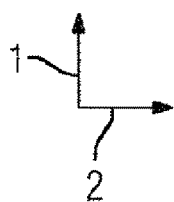

CAGE ROTOR COMPRISING A DEFORMABLE BEARING

CROSS-REFERENCES TO RELATED APPLICATIONS

This application is the U.S. National Stage of International Application No. PCT/EP2013/071142, filed Oct. 10, 2013, which designated the United States and has been published as International Publication No. WO 2014/067756 and which claims the priority of European Patent Application, Serial No. 12190600.2, filed Oct. 30, 2012, pursuant to 35 U.S.C. 119(a)-(d).

BACKGROUND OF THE INVENTION

The invention relates to a cage rotor according to the preamble of claim 1, an electric machine which comprises the cage rotor, and a laminated rotor core for the cage rotor. The invention further relates to a method for producing the cage rotor.

Such a cage rotor is disclosed in WO 2012/041943 A2, which describes measures for improving the quality of a cage rotor and an asynchronous machine in order to overcome or reduce the problems that occur in this case. According to said description, a cage rotor of an asynchronous machine has a bar in a laminated rotor core, wherein said bar can be tipped at a tipping point. In this case, the bar can advantageously be tipped in such a way that its ends can be tipped towards an axis of the cage rotor. A gap relative to the bar is therefore provided in the end region of the laminated rotor core, wherein the bar is able to bend in the direction of the gap. The gap therefore allows the ends of the rotor bar to bend towards the axis. This has the advantage that the bar can yield to a force which is produced if, upon solidification of the molten mass, the short-circuit ring contracts and a force is exerted on the bar in the direction of the axis of the cage rotor. This counteracts the problem that the electrical resistance between the short-circuit ring and the bar increases if the bar is not able to follow the short-circuit ring as it contracts during the cooling process. The joint between bar and short-circuit ring is critical to the operational characteristics of the cage rotor or the electric machine. An improvement of said joint automatically results in better electrical characteristics, particularly in respect of efficiency.

In view of the efforts being made to significantly reduce energy consumption, it is essential to develop a further technical contribution which alone, alternatively or in combination with known measures allows a highly efficient electric machine to be produced.

SUMMARY OF THE INVENTION

The object of the invention is therefore to provide a cage rotor for an electric machine which has a high level of efficiency.

According to one aspect of the invention, the object is achieved by a cage rotor for an electric machine, comprising
 a laminated rotor core which has a slot,
 a short-circuit ring which is cast onto an axial end of the laminated rotor core and is made of a first material, and
 a bar which is arranged in the slot,
wherein the bar is supported in the slot by a deformable bearing which has a bearing device.

According to another aspect of the invention, the object is achieved by a laminated rotor core for a cage rotor, having a slot and a bearing device.

The inventive laminated rotor core is provided for a cage rotor as per the invention, wherein the laminated rotor core comprises the slot and the bearing device.

According to still another aspect of the invention, the object is achieved by an electric machine as set forth above.

The inventive electric machine comprises a cage rotor as per the invention.

According to still another aspect of the invention, the object is achieved by a method for producing a laminated rotor core as set forth above, wherein the bearing device is produced on the laminated core.

According to an inventive method for producing a laminated rotor core as per the invention, the bearing device is produced on the laminated rotor core.

According to yet another aspect of the invention, the object is achieved by a method for producing a cage rotor as set forth above, wherein the bar is supported in the slot by a deformable bearing which has a bearing device.

According to the inventive method for producing a cage rotor as per the invention, the bar is supported in the slot by a deformable bearing which has a bearing device.

The inventive cage rotor advantageously achieves the cited object in that the bar is supported in the slot by the deformable bearing which has the bearing device. As a result, the bar is advantageously able to follow a contraction of the first material upon solidification of the molten mass of the first material after or during a casting-on of the short-circuit ring. An advantageous connection between the bar and the cast-on short-circuit ring, is therefore achieved, resulting in a low electrical resistance between the bar and the short-circuit ring and consequently in a cage rotor for an electric machine which is highly efficient.

Moreover, the deformable bearing advantageously leaves spaces free in the slot after deformation caused by the contraction of the first material, said space being required by the bar in order to follow a contraction of the first material upon solidification after or while the short-circuit ring is cast on. Inter glia, the extent of the spaces provided in the slot need only be modest. A thus achievable larger cross section of the bar in the slot and of the first material which may be present in the slot result in a low electrical resistance. This also helps to ensure that a highly efficient electric machine is achieved.

In addition, a mechanically solid connection between the bar and the cast-on short-circuit ring is advantageously achieved because the bar is able correspondingly to follow the contraction of the first material upon solidification of the molten mass.

The deformation of the deformable bearing is dependent on the forces which act on the deformable bearing as a result of the solidification of the first material. The deformable bearing may be completely deformed. The deformable bearing may exhibit a deformation which is limited to certain locations. The deformable bearing, in particular the bearing device, may be partially deformed.

If the deformable bearing is only partially deformed, the bar is advantageously able, even in the case of different distributions of force, to follow a contraction of the first material upon solidification of the molten mass of the first material after or during a casting-on of the short-circuit ring, without the bar resting in the slot base and therefore no longer being able to follow said contraction.

The deformation of the deformable bearing may be an elastic deformation. This advantageously gives a linear relationship between the force which acts as a result of the solidification of the molten mass and the distance over which the bar follows the solidifying molten mass.

The deformation of the deformable bearing may be a plastic deformation. At a point at which the bar rests on the deformable bearing, the deformable bearing therefore assumes a shape which is adapted to the bar. This advantageously results inter alia in the bar being guided in the deformable bearing.

In a cage rotor according to the invention, the bar may be so supported in the slot by the deformable bearing as to be remote from a slot base of the slot. This means that a counterforce is essentially established by the deformable bearing, in particular by the bearing device, counteracting the force which acts on the bar upon solidification of the first material as a result thereof. The force acting on the bar as a result of the solidification of the first material may deform the bearing device at least partially or even completely.

A cage rotor according to the invention is for an electric machine in which it is caused to rotate by a magnetic interaction between a stator of the electric machine and the cage rotor during operation of the electric machine, such that mechanical energy can be converted into electrical energy. The electrical energy can be withdrawn at a winding of the stator by connecting an electric load. Electrical energy can also be supplied via a winding of the stator during operation of the electric machine, and converted into mechanical energy by the magnetic interaction between stator and cage rotor. The cage rotor is caused to rotate in this case, and mechanical energy can be output via a shaft to a mechanical load in the form of a rotational movement.

In order for the cage rotor to rotate about the rotational axis, the cage rotor has a shaft which extends along the rotational axis and to which the laminated rotor core is attached. The laminated rotor core comprises plates which are arranged in layers from one axial end of the laminated rotor core to a further axial end of the laminated rotor core. For the purpose of accommodating the bar, the plates have openings which form the slot. The cage rotor has a winding for the magnetic interaction of the cage rotor with the stator. The winding surrounds the bar and the cast-on short-circuit ring which short circuits the winding. The lower the electrical resistance of the winding of the cage rotor, in particular the effective resistance during operation of the electric machine, the greater the efficiency level that is achieved in the case of an electric machine comprising the cage rotor. In order to achieve an advantageous rotation of the cage rotor in the electric machine, the cage rotor has one or more further bars, wherein the bar and the further bar or bars extend from the axial end of the laminated rotor core to the further axial end of the laminated rotor core, and are advantageously connected both electrically and mechanically at the axial end by the cast-on short-circuit ring in the same way as the bar and the cast-on short-circuit ring. At the further axial end of the laminated rotor core, the bar and the further bar or bars are advantageously connected correspondingly by a further cast-on short-circuit ring in the same way as the bar at the bar end with the cast-on short-circuit ring. In order to secure the bar and the further bar or bars, the first material of the cast-on short-circuit ring can extend through the slot to the other cast-on short-circuit ring.

An axial direction is a direction parallel to the rotational axis and a radial direction is a direction perpendicular to the rotational axis. Moving outwards from the rotational axis in a radial direction, the slot base of the slot is encountered first, and then the bar which is arranged in the slot.

An electric machine may have a housing for protecting the electric machine in which the stator is arranged, the rotor being rotatably supported within the stator. The rotatable bearing of the cage rotor can be provided via the shaft by means of bearings in the housing.

In addition to the advantages specified above, an electric machine according to the invention also has the further advantage that, in addition to the high level of efficiency of the electric machine, the bearings for bearing the cage rotor in the housing show little wear. As a result of the deformable bearing for the bar in the slot, it is possible to achieve a more accurate mass distribution of the cage rotor about the rotational axis, thereby reducing any imbalance of the cage rotor. The reduced wear of the bearings causes lower friction losses in the bearings, thereby making it possible to provide a highly efficient electric machine.

A further advantage of the laminated rotor core according to the invention is that the laminated rotor core has the advantageous deformable bearing. Therefore the bar can advantageously be supported in the laminated rotor core before the short-circuit ring is cast on.

An inventive method for producing a laminated rotor core according to the invention also has the advantage that the bearing device is advantageously produced on the laminated rotor core. Inter alia, the bearing device can advantageously be produced at low cost.

An inventive method for producing a cage rotor according to the invention has the further advantage that the deformable bearing is advantageously distorted, at least partially. Inter alia, the deformable bearing is gradually distorted by the active forces resulting from the solidification of the molten mass, without thereby adversely affecting the manufacture of the cage rotor.

Advantageous embodiments of the invention are specified in the dependent claims.

In an advantageous embodiment of the inventive cage rotor, the deformable bearing has, at an axial distance a from the bearing device, at least one further bearing device. It is thereby possible to achieve greater uniformity in the distance of the bar from the slot base over an axial length of the laminated rotor core from the axial end to the further axial end. Greater efficiency is therefore achieved in the case of an electric machine according to the invention. When manufacturing a plurality of cage rotors according to the invention, any difference in efficiency levels is advantageously reduced. In an electric machine according to the invention, the service life of the bearings in the housing is increased because the cage rotors exhibit less imbalance.

In a cage rotor according to the invention, the axial distance a can have a length which is defined by a value from a range of values. The range of values starts at a first value and ends at a second value. The first value for the axial distance a is at least sufficiently great that the bearing device can be deformed without being restricted by the further bearing device. When the bearing device is deformed by a force which acts on the bar, a material from which the bearing device is made must also be capable inter alia of moving in an axial direction in the slot. Depending on their distribution, the active forces resulting from the solidification of the molten mass of the first material may act on the bearing device and/or on the further bearing device owing to a lever action of the bar. This can result in not only a transformation of the forces in accordance with the lever principle, but also in warping of the bar. As a result of said warping, the bar occupies more space in the slot that if it retained its original shape, which was adapted to the slot in an axial direction. The increased space can be seen from a projection of the cross sections of the bar in an axial direction as compared with an individual cross section of the bar in the slot. In the case of a warped bar, it is evident that a radial extent of the projection is greater than the radial extent of an individual cross section of the bar. The second value of the range of values is therefore defined in that the maximum curvature of the bar in the slot should only slightly increase a radial extent of the bar in the slot, said extent being determined from a projection of the cross sections of the bar in an axial direction, relative to an individual cross section of the bar in the slot. By this means, an almost uniform distance of the bar from the slot base in the slot can be achieved along an axial direction of the laminated rotor core, and the slot can be filled to the greatest extent possible by the rotor bar and/or the first material. This results in a cage rotor or an electric machine which is highly efficient. The radial extent of the bar as a result of the curvature is advantageously no greater than a radial extent of the individual cross section of the bar plus twice the distance of the bar from the slot base on a plane that is perpendicular to the axial direction in which the deformable bearing has the bearing device.

In a cage rotor according to the invention, the bearing device may be arranged in the vicinity of the axial end of the laminated rotor core, and the further bearing device in the vicinity of the further axial end of the laminated rotor core. This increases the probability of being able to prevent the bar which is arranged in the slot from tipping before the short-circuit ring is cast on, and allows a more accurate mass distribution of the cage rotor about the rotational axis to be achieved. This advantageously allows the manufacture of laminated rotor cores and cage rotors which can be used to achieve highly efficient electric machines.

In a cage rotor according to the invention, the laminated rotor core comprises the bearing device at the axial end of the laminated rotor core. This allows an advantageous arrangement of the bar in the slot. Inter alia, it is advantageously possible to visually inspect and more easily correct a mounting of the bar on the bearing device of the deformable bearing. Highly efficient electric machines can therefore be achieved.

In a further advantageous embodiment of a cage rotor according to the invention, the bearing device has a bearing unit which is integrally connected to the laminated rotor core. The properties of the bearing device of the deformable bearing are therefore established in a defined manner. This means that the bearing device can advantageously be produced integrally on the laminated rotor core, in particular during the manufacture of a laminated rotor core. A cage rotor for a highly efficient electric machine is achieved because the forces resulting from the solidification of the molten mass of the first material cause a desired deformation of the deformable bearing by virtue of the established properties of the bearing device. Inter alia, any manufacturing variations in the production of a laminated rotor core according to the invention and a cage rotor according to the invention then have less effect on the efficiency of an electric machine.

In a further advantageous embodiment of a cage rotor according to the invention, the laminated rotor core comprises a first plate, which has the bearing unit. Therefore the properties of a plate from which the first plate and the bearing unit are produced as a single piece can advantageously be used for a deformable bearing, in order thereby to achieve a highly efficient electric machine. Inter alia, plates are advantageously thin and can be made into a suitable shape with a high degree of dimensional accuracy by means of processing steps that are applied during the manufacture of the laminated rotor core. Said suitable shape can be specified very precisely, such that the bearing unit provides a defined counterforce when counteracting the forces that act as a result of the solidification of the molten mass of the first material, a defined deformation of the bearing unit is produced, and the temporal profile of the counterforce and of the deformation of the bearing unit is adapted to the temporal profile of the active forces in such a way that a connection which results in a highly efficient electric machine is achieved between the first material and the bar.

During manufacture of the first plate, the bearing unit can advantageously be produced on the plate by means of machining, e.g. stamping.

A cage rotor according to the invention may have a positioning element in the slot, said positioning element being integrally connected to a plate of the laminated rotor core. The positioning element can advantageously interact with the deformable bearing, in order to hold the bar in a defined position before and/or during the solidification of the molten mass of the first material. This advantageously supports the action of the deformable bearing, resulting in a highly efficient electric machine. The plate can therefore be manufactured with the positioning element from one piece of plate. The positioning element can advantageously be produced on the plate by means of machining said plate in a corresponding manner during the manufacture thereof.

In a cage rotor according to the invention, the first plate can have the positioning element. A defined interaction of the positioning element with the bearing unit is advantageously realized thereby. Process variations during manufacture of the laminated rotor core or of the cage rotor have little effect on the interaction of the positioning element with the bearing unit.

In a further advantageous embodiment of a cage rotor according to the invention, the laminated rotor core comprises at least one further plate having a further bearing unit, said further plate being arranged adjacently to the first plate in an axial direction. It is advantageously possible thereby to select a rigidity of the bearing device. The further bearing unit can increase the counterforce of the bearing unit. By virtue of the further plate being arranged adjacently to the first plate in the axial direction, the further bearing unit and the bearing unit support each other, such that a different temporal profile of the deformation of the bearing device can be selected, wherein said temporal profile can advantageously be adapted temporally to the force which acts as a result of the solidification of the molten mass of the first material. A highly efficient electric machine can therefore be achieved.

In a further advantageous embodiment of a cage rotor according to the invention, the bearing device is provided in a slot base of the slot. In this way, the bearing device can advantageously counteract the force which acts as a result of the solidification of the molten mass of the first material, said force acting in a radial direction towards the rotational axis in particular. A highly efficient electric machine is advantageously achieved thereby. The embodiment of the bearing device in the slot base of the slot can advantageously be small. Inter alia, the bar need only be supported at one point of the bearing device in the slot base of the slot. By virtue of the bearing device in the slot base of the slot, with a larger cross section for the winding, in particular for the bar, and possibly for the first material in the slot, the slot can be used to achieve a low electrical resistance.

In a cage rotor according to the invention, the bearing device in the slot base of the slot can be a piece of wire. The shape of the wire allows the wire to be arranged advantageously in the slot base of the slot and, taking into consideration the material properties of the wire, an advantageous embodiment of a bearing device of a deformable bearing. The wire is squeezed apart by the bar by virtue of the forces acting on the bar as a result of the solidification of the molten mass of the first material, and therefore the bar can follow the solidifying molten mass of the first material, in particular in a radial direction towards the rotational axis. This means that a good connection is achieved between the bar and the solidifying molten mass, thereby ensuring a highly efficient electric machine. The bar can be supported on one piece of wire or on a plurality of wire pieces which are possibly arranged one behind the other in an axial direction. The bearing device can therefore advantageously be produced by installing the wire in the slot, particularly during the manufacture of a laminated rotor core. The wire can extend from the axial end of the laminated rotor core to the further axial end of the laminated rotor core. By this means, the bar can advantageously be supported at an almost uniform distance from the slot base of the slot, from the axial end of the laminated rotor core to the further axial end of the laminated rotor. This allows a highly efficient electric machine.

The counterforce provided by the wire can be set by selecting the material of the wire as appropriate. It is advantageously possible to select a soft material here, such that a suitable counterforce allows the bar to follow the solidifying molten mass of the first material. It is therefore advantageously possible to produce the bearing device by selecting a wire made of a soft material and installing said wire into the slot, in particular during the manufacture of a laminated rotor core.

The wire can advantageously be guided through further slots of the laminated rotor core. Inter alia, this allows the laminated rotor core and/or the cage rotor to be produced in a simple and time-saving manner.

In a further advantageous embodiment of a cage rotor according to the invention, the bearing unit has at least one carrier in each case on two lateral surfaces which delimit the slot in a circumferential direction. The bar is therefore advantageously supported in the slot by the deformable bearing. Inter alia, the slot base is advantageously free. If forces act on the bar as a result of the solidification of the molten mass of the first material, the carriers are deformed and can be squeezed to the side by the active forces if necessary. This means that the bar can advantageously be moved deeper into the slot base in a radial direction towards the rotational axis. A circumferential direction can be a direction in which the cage rotor can execute the rotational movement about the rotational axis.

In a cage rotor according to the invention, the bar can be supported in a suspended manner by the deformable bearing, the bearing device comprising a suspension device in this case. By this means, the bar can advantageously be arranged precisely in the slot and retains its position even if the bar does not completely fill the slot and the first material is not yet present in the slot. A highly efficient electric machine can be achieved in this way.

The suspension device can advantageously be formed by the carriers provided in each case by the bearing unit on two lateral surfaces which delimit the slot in a circumferential direction. It is advantageously possible to dispense with a positioning element if the carriers also advantageously prevent the bar from moving in a radial direction which would take the bar further away from the slot base. The cross section of the slot can therefore advantageously be used for the winding, in particular for the bar, and possibly for the first material in the slot.

BRIEF DESCRIPTION OF THE DRAWING

The properties, features and advantages of the invention described above, and the means by which these are achieved, become clearer and easier to understand in the context of the following description of the exemplary embodiments, these being explained in greater detail with reference to the figures, in which:

FIG. 1 shows a first exemplary embodiment of an electric machine, comprising a first exemplary embodiment of a cage rotor, FIG. 4 shows a second exemplary embodiment of an electric machine, comprising a second exemplary embodiment of a cage rotor, FIG. 5 shows an extract of a cross section along the line V-V from FIG. 4, FIG. 6 shows a second exemplary embodiment of a laminated rotor core, FIG. 8 shows a third exemplary embodiment of an electric machine, comprising a third exemplary embodiment of a cage rotor, FIG. 9 shows an extract of a cross section along the line IX-IX from FIG. 8, and FIG. 10 shows a third exemplary embodiment of a laminated rotor core.

DETAILED DESCRIPTION OF PREFERRED EMBODIMENTS

Figure 2:
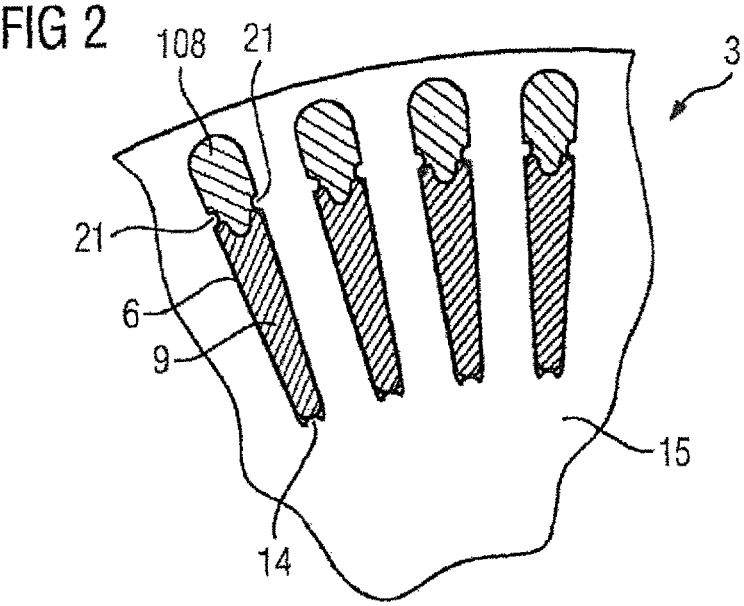
FIG. 2 shows an extract of a cross section along the line II-II from FIG. 1.

FIG. 1 shows a first exemplary embodiment of an electric machine 4, comprising a first exemplary embodiment of a cage rotor 3. The electric machine 4 is an asynchronous machine and has a housing 101 in which the stator 102 is arranged. The stator 102 has a winding 103. The cage rotor 3 is attached to a shaft 18, which is so supported by rolling bearings 17 in the housing 101 as to be rotatable about the rotational axis 19. The cage rotor 3 comprises a laminated rotor core 5 which has a slot 6, a short-circuit ring 8 that is cast onto an axial end 7 of the laminated rotor core 5 and is made of a first material 108, and a bar 9 which is arranged in the slot 6 and is supported in the slot 6 by a deformable bearing 10. The deformable bearing 10 comprises a bearing device 12 and a further bearing device 121. The cage rotor has the further bearing device 121 at an axial distance a from the bearing device 12. The bar 9 is supported by the deformable bearing 10 in the slot 6 at a distance from a slot base 13. A winding of the cage rotor 3 comprises, in addition to the bar 9, a further bar 109, the short-circuit ring 8 and the further short-circuit ring 110, and further bars which are arranged in further slots of the cage rotor 3. Moving outwards from the rotational axis 19 in a radial direction 1, the slot base 13 of the slot 6 is reached first, followed by the bar 9 which is arranged in the slot 6. The bearing device 12 and the further bearing device 121 comprise bearing units 14 which are integrally connected to the laminated rotor core 5. For the sake of clarity in FIG. 1, only a bearing unit 14 and one further bearing unit 141 of a further deformable bearing, by means of which the further bar 109 is supported in a further slot of the laminated rotor core 5, are denoted by reference signs 14, 141. The laminated rotor core 5 comprises a first plate 15, which features bearing units 14 in the slot 6 and in the further slot. The laminated rotor core 5 comprises further plates 16 featuring further bearing units 141 in the slot 6 and the further slot, said further plate being arranged adjacently to the first plate 15 in an axial direction 2.

The first plate 15 and the further plates 16 have a thickness of 0.65 mm. In order that the bar 9 can follow the molten mass of the first material 8 during solidification as per the invention, the bearing devices 12, 121 each have five bearing units 14, 141, these being integrally connected to plates 15, 16. In the first exemplary embodiment of the cage rotor 3, the bearing device 12 and the further bearing device 121 each have an axial length of 3.25 mm, wherein a layered arrangement of plates, in particular of the first plate 15 and the further plates 16 is considered to be ideal without intermediate spaces between the plates. Furthermore, starting from the axial end 7 and the further axial end 11 of the laminated rotor core 5 in each case, the laminated rotor core 5 firstly has four layered plates which do not feature a bearing unit 14, 141.

The first material 108 is aluminum and is cast onto the cage rotor 3 in a die-casting process. The bar 9 comprises copper as a material. Upon solidification of the molten mass of the first material 108 after or during casting-on of the short-circuit rings 8 by means of the die-casting process, the bar 9, the further bar 109 and the further bars follow the contraction of the first material 108. Electrically and mechanically advantageous connections are formed between the bar 9, the further bar 109 and the further bars and the first material 108 which surrounds the bar 9, the further bar 109 and further bars.

FIG. 2 shows an extract of a cross section of the cage rotor 3 from FIG. 1 along the line II-II. In addition to the elements of the cage rotor 3 as per FIG. 1, FIG. 2 shows positioning elements 21. It can also be seen that the bearing unit 14 has a spiked shape and is integrally connected to the first plate 15. The spiked shape is one possibility for supporting the bar 9 at just one point of the bearing devices 12, 121 in the slot base 13 of the slot 6. The further bearing units 141 are embodied in the same way as the bearing unit 14. The forces acting on the bar 9 as a result of the solidification of the molten mass cause a deformation of the deformable bearing 10. In particular, as a result of the solidification of the molten mass of the first material 108, the bar 9 is displaced in a radial direction 1 towards the shaft 18 by the active forces. As a result of the active forces, the bearing devices 12, 121 are at least partially deformed, in an elastic or plastic manner in particular. The bearing unit 14 or the further bearing units 141 may therefore exhibit squeezing, distortion or various distortions. In the case of an elastic deformation of the bearing devices 12, 121, the deformation can be reversed again if the conditions of force in the cage rotor 3 are changed, e.g. by partially demolishing the cage rotor 3.

Figure 3:
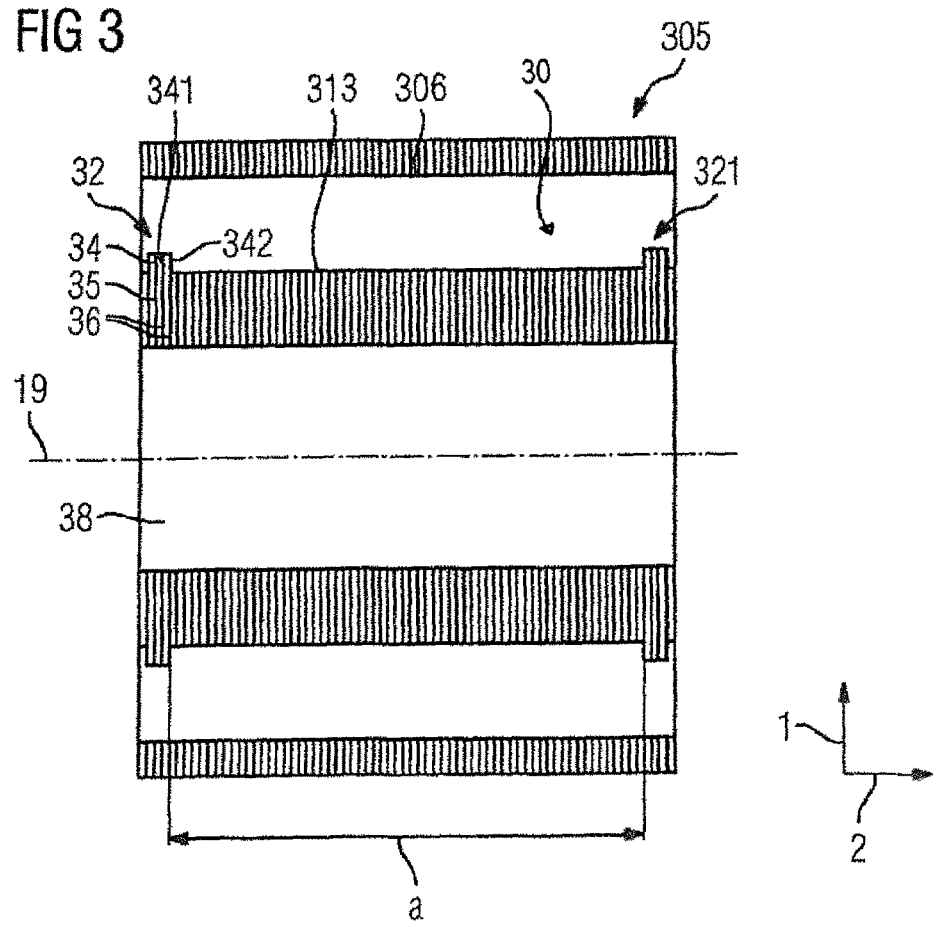
FIG. 3 shows a first exemplary embodiment of a laminated rotor core.

FIG. 3 shows a first exemplary embodiment of a laminated rotor core 305. This laminated rotor core 305 has a slot 306 and a bearing device 32. This bearing device 32 is provided in a slot base 313 of the slot 306. The bearing device has three bearing units 34, 341, 342, which are integrally connected to the laminated rotor core 305. In this case, a first plate 35 comprises one bearing unit 34 of the three bearing units 34, 341, 342. A further plate 36 of the laminated rotor core 305 comprises the further bearing unit 341, said further plate 36 being arranged adjacently to the first plate 35 in the axial direction 2. A deformable bearing 30 of the laminated rotor core 305 comprises the bearing device 32 and, at an axial distance a from the bearing device 32, a further bearing device 321 having a configuration which corresponds to that of the bearing device 32. The laminated rotor core 305 has an opening 38 for a shaft. The plates of the laminated rotor core 305, which include the first plate 35 and the further plate 36, are arranged in a layered manner in the axial direction 2. The bearing device 32 is produced on the laminated rotor core 305 by stamping out the plates 35, 36 in such a way that the bearing units 34, 341, 342 are integrally connected in each case to one of the plates 35, 36, and the layered arrangement is achieved by bundling the stamped plates. The laminated rotor core 305 is designed to rotate about a rotational axis 19 extending in an axial direction 2, and is symmetrical relative to said rotational axis 19.

FIG. 4 shows a second exemplary embodiment of an electric machine 44, comprising a second exemplary embodiment of a cage rotor 43. The cage rotor 43 has a laminated rotor core 605, comprising a slot 406, and a bar 49 which is arranged in the slot 406 and is supported in the slot 406 by a deformable bearing 40. The deformable bearing 40 comprises a bearing device 42 and, at an axial distance a from the bearing device 42, a further bearing device 421.

FIG. 5 shows that in the second exemplary embodiment as per FIG. 4 the carriers 51, 52 form a suspension device by means of which the bar 49 is suspended in the slot. The carriers 51, 52 interact with indents 53, 54 on lateral surfaces of the bar 49, such that said carriers 51, 52 also function as positioning elements. The lateral surfaces of the bar 49 are those surfaces which are adjacent, when the bar 49 is arranged in the slot 406, to the two lateral surfaces 71, 72 (see FIG. 7) that delimit the slot 406 in a circumferential direction.

FIG. 6 shows a second exemplary embodiment of a laminated rotor core 605.

Figure 7:
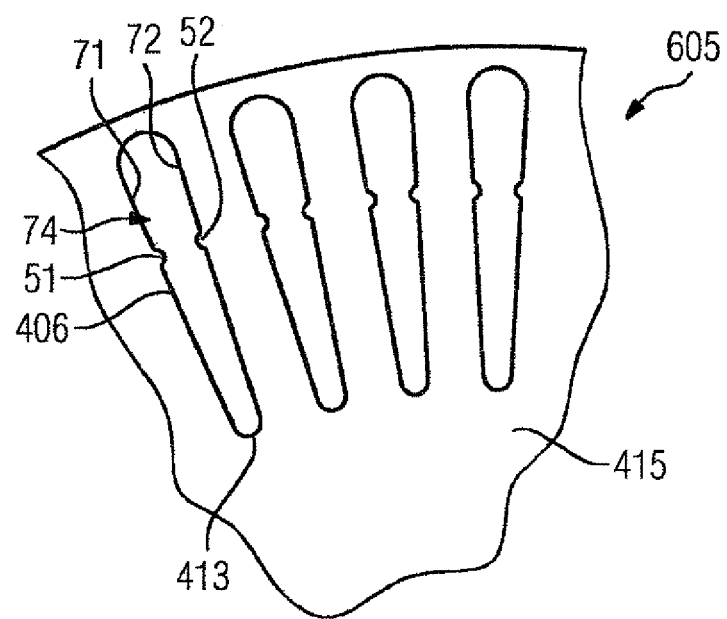
FIG. 7 shows an extract of a view of the laminated rotor core as per FIG. 6 seen in an axial direction.

FIG. 7 shows an extract of a view of the laminated rotor core 605 as per FIG. 6 seen in an axial direction 2. FIG. 6 and FIG. 7 show the laminated rotor core 605 which is included in the cage rotor 43 according to a second exemplary embodiment as shown in FIG. 4. The deformable bearing 40 comprises a bearing device 42 and, at an axial distance a from the bearing device 42, a further bearing device 421, as shown inter alia in FIG. 4. The bearing device 42 and the further bearing device 421 comprise bearing units 74 which are shown in FIG. 7 on a first plate 415 of the laminated rotor core 605. The bearing unit 74 comprises in each case a carrier 51, 52 on two lateral surfaces 71, 72 which delimit the slot 406 in a circumferential direction. The laminated rotor core 605 has further plates 416 comprising in each case further bearing units which correspond in their design to the bearing unit 74 as per FIG. 7 and are arranged adjacently to the first plate 415 in an axial direction 2. The laminated rotor core 605 starts at one axial end 61 with the first plate 415 and ends at a further axial end 62 with a plate which corresponds in design to the first plate 415 comprising a bearing unit 74 as per FIG. 7. The laminated rotor core 605 therefore comprises the bearing device 42 and the further bearing device 421 respectively at the axial end 61 and at the further axial end 62 of the laminated rotor core 605.

FIG. 8 shows a third exemplary embodiment of an electric machine 84, comprising a third exemplary embodiment of a cage rotor 83. The cage rotor 83 has a laminated rotor core 105 comprising a slot 806, and a bar 89 which is arranged in the slot 806 and is supported in the slot 806 by a deformable bearing 80 that has a bearing device 82. The laminated rotor core 105 comprises plates 815, which are arranged in a layered manner in an axial direction 2. The bearing device 82 is provided in a slot base 813 of the slot 806. The bearing device 82 is a wire, which comprises aluminum as a material and extends from one axial end 81 of the laminated rotor core 105 to a further axial end 85 of the laminated rotor core 105. By virtue of the aluminum, the wire is soft as a bearing device 82 and can be squeezed apart by the forces which act as a result of solidification of the molten mass of the first material 108. The bar 89 can therefore follow the contraction resulting from solidification of the molten mass of the first material 108 in a radial direction 1 relative to the shaft 18, in order to ensure a connection having low electrical resistance between the bar 89 and the short-circuit rings.

FIG. 9 shows an extract of the third exemplary embodiment of a cage rotor 83 as per FIG. 8 along the line IX-IX.

FIG. 10 shows a third exemplary embodiment of a laminated rotor core 105, which corresponds to the laminated rotor core that is included in the third exemplary embodiment of a cage rotor 83 as per FIG. 8. The laminated rotor core 105 comprises the slot 806 and the bearing device 82. In order to ensure that the bearing device 82 has been produced and is present in the slot base 813 before a bar is placed in the slot 806, the wire which constitutes the bearing device 82 can be guided through further slots of the laminated rotor core 105. For this purpose, the wire is guided from the axial end 81 of the laminated rotor core 105 in an axial direction 2 through the slot 806 to the further axial end 85 of the laminated rotor core 105. At the further axial end 85, the wire is guided along a last plate 817 of the laminated rotor core 105 to a further slot. In the further slot, the wire is guided from the further axial end 85 of the laminated rotor core 105 to the axial end 81 of the laminated rotor core 105.

Although the invention is illustrated and described in detail with reference to preferred exemplary embodiments, the invention is not restricted by the examples disclosed herein, and other variations may be derived therefrom by a person skilled in the art without thereby departing from the scope of the invention.

Inter alia, further exemplary embodiments are conceivable in which the bearing device comprises a corrugated plate or springs, in particular steel springs, or a spring steel.

The invention claimed is:

1. A cage rotor for an electric machine, said cage rotor comprising:
   a laminated rotor core having a slot;
   a short-circuit ring cast onto an axial end of the laminated rotor core and made of a first material;
   a bar; and
   a deformable bearing having a bearing device to support the bar in the slot,
   wherein a magnetic interaction is established between the cage rotor and a winding of a stator thereby producing mechanical energy which causes the cage rotor to rotate;
   wherein the deformable bearing has two bearing devices which are axially spaced from each other and support the bar at a distance from a slot base, which distance has a constant dimension along an axial length of the slot,
   wherein the bearing devices have first and second bearing units formed in one piece with the laminated rotor core as immovable bearing units which are spaced axially from each other and from axial ends of the laminated rotor core,
   wherein the immovable bearing units extend permanently in a radial direction from the laminated core and have radially outer surfaces extending in an axial direction and, with the permanent radial extension of the immovable bearing units, supporting the bar in the slot.

2. The cage rotor of claim 1, wherein the laminated rotor core comprises a first plate configured to form the first bearing unit.

3. The cage rotor of claim 2, wherein the laminated rotor core comprises a second plate configured to form the second bearing unit and arranged adjacent to the first plate in an axial direction.

4. The cage rotor as of claim 1, wherein the bearing devices are arranged in a base of the slot.

5. The cage rotor of claim 1, wherein the first bearing unit has at least one carrier on two lateral surfaces which delimit the slot circumferentially.

6. The cage rotor of claim 1, wherein each of the bearing units have a radially inner end integrally connected with the laminated core and extending over an axial distance, and wherein the radially outer surface of each of the bearing units extends over the same axial distance as the radially inner end of the same bearing unit.

7. A laminated rotor core for a cage rotor, comprising:
   a plurality of plates placed adjacent to one another and defining a slot; and
   a deformable bearing configured to support a bar in the slot,
   wherein a magnetic interaction is established between the cage rotor and a winding of a stator thereby producing mechanical energy which causes the cage rotor to rotate,
   wherein the deformable bearing has two bearing devices which are axially spaced from each other and support the bar at a distance from a slot base, which distance has a constant dimension along an axial length of the slot,
   wherein the bearing devices have first and second bearing units formed in one piece with the laminated rotor core as immovable bearing units which are spaced axially from each other and from axial ends of the laminated rotor core,
   wherein the immovable bearing units extend permanently in a radial direction from the laminated core and have radially outer surfaces extending in an axial direction and, with the permanent radial extension of the immovable bearing units, supporting the bar in the slot.

8. The laminated rotor core of claim 7, wherein a first one of the bearing devices has the first bearing unit which is formed in one piece with a first one of the plates.

9. The laminated rotor core of claim 8, wherein a second one of the bearing devices has the second bearing unit which is formed by a second one of the plates arranged adjacent to the first one of the plates in an axial direction.

10. The laminated rotor core of claim 8, wherein the first bearing unit has at least one carrier on two lateral surfaces which delimit the slot circumferentially.

11. The laminated rotor core of claim 7, wherein the bearing devices are arranged in a base of the slot.

12. The cage rotor of claim 7, wherein each of the bearing units have a radially inner end integrally connected with the laminated core and extending over an axial distance, and wherein the radially outer surface of each of the bearing units extends over the same axial distance as the radially inner end of the same bearing unit.

13. An electric machine, comprising
   a cage rotor which includes a laminated rotor core having a slot, a short-circuit ring cast onto an axial end of the laminated rotor core and made of a first material, a bar, and a deformable bearing having a bearing device to support the bar in the slot, wherein a magnetic interaction is established between the cage rotor and a winding of a stator thereby producing mechanical energy which causes the cage rotor to rotate, wherein the deformable bearing has two bearing devices which are axially spaced from each other and support the bar at a distance from a slot base, which distance has a constant dimension along an axial length of the slot, wherein the bearing devices have first and second bearing units formed in one piece with the laminated rotor core as immovable bearing unit which are spaced axially from each other and from axial ends of the laminated rotor core, wherein the immovable bearing units extend permanently in a radial direction from the laminated core and have radially outer surfaces extending in an axial direction and, with the permanent radial extension of the immovable bearing units, supporting the bar in the slot.

14. The cage rotor of claim 13, wherein each of the bearing units have a radially inner end integrally connected with the laminated core and extending over an axial distance, and wherein the radially outer surface of each of the bearing units extends over the same axial distance as the radially inner end of the same bearing unit.

15. A method for producing a laminated rotor core for a cage rotor, said method comprising:
    placing a plurality of plates in side-by-side arrangement to define a slot for receiving a bar; and
    forming a deformable bearing device by at least having two bearing devices formed by two of the plates to provide a support of the bar in the slot; and
    establishing a magnetic interaction between the cage rotor and a winding of a stator thereby producing mechanical enemy which causes the cage rotor to rotate,
    wherein the two be devices are axially spaced from each other and support the bar at a distance from a slot base, which distance has a constant dimension along an axial length of the slot,
    wherein the be devices have first and second bearing units formed in one piece with the laminated rotor core as immovable bearing units which are spaced axially from each other and from axial ends of the laminated rotor core,
    wherein the immovable bearing units extend permanently in a radial direction from the laminated core and have radially outer surfaces extending in an axial direction and, with the permanent radial extension of the immovable bearing units, supporting the bar in the slot.

16. The cage rotor of claim 15, wherein each of the bearing units have a radially inner end integrally connected with the laminated core and extending over an axial distance, and wherein the radially outer surface of each of the bearing units extends over the same axial distance as the radially inner end of the same bearing unit.

17. A method for producing a cage rotor, said method comprising:
    producing a laminated rotor core from a plurality of plates;
    arranging a bar in a slot formed by the plates of the laminated rotor core;
    supporting the bar in the slot by a deformable bearing with a bearing device;
    casting a short-circuit ring on an axial end of the laminated rotor core, and
    establishing a magnetic interaction between the cage rotor and a winding of a stator thereby producing mechanical energy which causes the cage rotor to rotate,
    wherein the deformable bearing has two bearing devices which are axially spaced from each other and support the bar at a distance from a slot base, which distance has a constant dimension along an axial length of the slot,
    wherein the bearing devices have first and second bearing units formed in one piece with the laminated rotor core as immovable bearing units which are spaced axially from each other and from axial ends of the laminated rotor core,
    wherein the immovable bearing units extend permanently in a radial direction from the laminated core and have radially outer surfaces extending in an axial direction and, with the permanent radial extension of the immovable bearing units, supporting the bar in the slot.

18. The cage rotor of claim 17, wherein each of the bearing units have a radially inner end integrally connected with the laminated core and extending over an axial distance, and wherein the radially outer surface of each of the bearing units extends over the same axial distance as the radially inner end of the same bearing unit.

* * * * *